(12) United States Patent
Liang et al.

(10) Patent No.: US 9,001,726 B2
(45) Date of Patent: *Apr. 7, 2015

(54) METHOD FOR IMPLEMENTING RELAY STATION DOWNLINK COOPERATIVE RETRANSMISSION AND A RELAY STATION

(75) Inventors: Feng Liang, Shenzhen (CN); Feng Bi, Shenzhen (CN); Jin Yang, Shenzhen (CN); Ming Yuan, Shenzhen (CN); Shuanshuan Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 615 days.

This patent is subject to a terminal disclaimer.

(21) Appl. No.: 13/258,321

(22) PCT Filed: Mar. 24, 2010

(86) PCT No.: PCT/CN2010/071277
§ 371 (c)(1),
(2), (4) Date: Nov. 15, 2011

(87) PCT Pub. No.: WO2010/133103
PCT Pub. Date: Nov. 25, 2010

(65) Prior Publication Data
US 2012/0057521 A1 Mar. 8, 2012

(30) Foreign Application Priority Data

May 22, 2009 (CN) .......................... 2009 1 0085502

(51) Int. Cl.
*H04B 7/14* (2006.01)
*H04L 1/18* (2006.01)
*H04L 1/00* (2006.01)

(52) U.S. Cl.
CPC ............ *H04L 1/1893* (2013.01); *H04L 1/1887* (2013.01); *H04L 2001/0097* (2013.01)
USPC ............................ 370/315; 370/472; 370/492

(58) Field of Classification Search
USPC .................. 370/315, 472, 492, 545
See application file for complete search history.

(56) References Cited

U.S. PATENT DOCUMENTS

2008/0123574 A1 5/2008 Sandhu et al.
(Continued)

FOREIGN PATENT DOCUMENTS

| CN | 101242250 A | 8/2008 |
| CN | 101267241 A | 9/2008 |

(Continued)

OTHER PUBLICATIONS

International Search Report on international application No. PCT/CN2010/071277, mailed on Jun. 3, 2010.
(Continued)

*Primary Examiner* — Brandon Renner
*Assistant Examiner* — Scott M Sciacca
(74) *Attorney, Agent, or Firm* — Oppedahl Patent Law Firm LLC (57) ABSTRACT

A method for implementing relay station downlink retransmission and a relay station are disclosed by the present invention. According to the situation of the least available radio resource number for retransmission data on a retransmission sub-frame, the relay station of the present invention performs corresponding physical layer processing in advance for the data to be retransmitted until the OFDM signal is generated, and retransmits the OFDM signal on the retransmission sub-frame. By the method of the present invention, the problem is resolved efficiently that the relay station cooperative communication cannot be performed normally due to the change of the radio resource number during downlink data retransmission, so that the normal implementation of the relay station downlink cooperative communication is ensured; furthermore, the method of the present invention does not induce any extra overhead and time delay, needs no signaling control, can be easily implemented, reduces the system complexity, ensures the flexibility of sub-frame configuration, thereby improving service quality and resource utilization rate.

9 Claims, 4 Drawing Sheets

(56) References Cited

U.S. PATENT DOCUMENTS

| | | |
|---|---|---|
| 2008/0227386 A1 | 9/2008 | Dayal et al. |
| 2008/0273616 A1 | 11/2008 | Papasakellariou |
| 2009/0005104 A1* | 1/2009 | Wang et al. .................. 455/522 |
| 2009/0015443 A1 | 1/2009 | Zhang et al. |
| 2009/0141676 A1 | 6/2009 | Maheshwari |
| 2009/0262678 A1* | 10/2009 | Oyman et al. ................ 370/315 |
| 2009/0268790 A1* | 10/2009 | Josiam et al. ................. 375/211 |
| 2010/0246599 A1* | 9/2010 | Wang et al. ................... 370/465 |
| 2010/0265874 A1 | 10/2010 | Palanki et al. |
| 2011/0176477 A1 | 7/2011 | Lee et al. |
| 2012/0106433 A1 | 5/2012 | Seo et al. |
| 2012/0113884 A1 | 5/2012 | Park et al. |
| 2012/0127910 A1 | 5/2012 | Li |
| 2012/0213148 A1 | 8/2012 | Saito et al. |
| 2013/0230013 A1 | 9/2013 | Seo et al. |

FOREIGN PATENT DOCUMENTS

| | | |
|---|---|---|
| CN | 101282204 A | 10/2008 |
| CN | 101316373 A | 12/2008 |
| CN | 101383685 A | 3/2009 |
| EP | 2015504 A2 | 1/2009 |
| JP | 2009005227 A | 1/2009 |
| WO | 2008059355 A2 | 5/2008 |

OTHER PUBLICATIONS

English Translation of the Written Opinion of the International Search Authority in international application No. PCT/CN2010/071277, mailed on Jun. 3, 2010.

ZTE, Type II relay for DL cooperative retransmission, 3GPP TSG RAN1 #57, R1-091711, Apr. 28, 2009. (5 pages—see entire document).

International Search Report in international application No. PCT/CN/2010/071194, mailed on Jul. 1, 2010. (2 pages—see entire document).

English Translation of the Written Opinion of the International Search Authority in international application No. PCT/CN/2010/071194, mailed on Jul. 1, 2010. (3 pages—see entire document).

Supplementary European Search Report in European application No. 10777307.9, mailed on Feb. 9, 2015. (7 pgs—see entire document).

* cited by examiner

METHOD FOR IMPLEMENTING RELAY STATION DOWNLINK COOPERATIVE RETRANSMISSION AND A RELAY STATION

TECHNICAL FIELD

The present invention relates to the field of relay, and in particular to a method for implementing relay station downlink cooperative retransmission and a relay station.

BACKGROUND

It is required by the future wireless communication and cellular system to increase the coverage and support higher transmission rate, which is a new challenge for the wireless communication technology. At the same time, the cost of system building and maintenance has become more expensive. With the increase in the transmission rate and communication distance, the problem of battery power consumption has become evident. Moreover, the future wireless communication will employ higher frequency, which will lead to more severe path loss and path attenuation. As a new technology, the relay technology has drawn more and more attention, and is viewed as a key B3G/4G technology. The traditional single hop link can be divided into a plurality of multi-hop links by the relay technology to shorten the distance, which greatly reduces the path loss and is helpful for increasing the transmission quality and enlarging the communication range, so as to provide services with higher speed and higher quality for the users.

Figure 1:
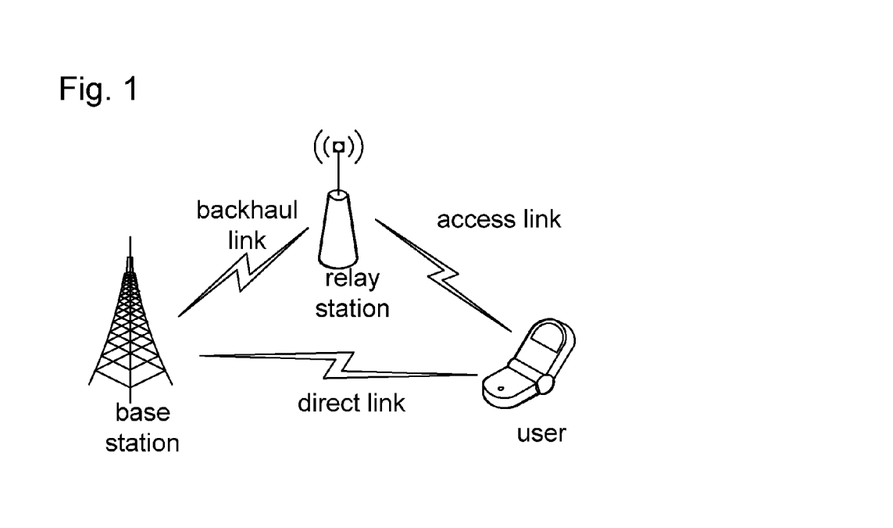
FIG. 1 shows a structural diagram of a relay network.

FIG. 1 shows a structural diagram of a relay network. In the relay network, as shown in FIG. 1, a link between a user served by a relay station and the relay station is called an access link, a link between the relay station and a base station is called a backhaul link and a link between the user served by the base station and the base station is called a direct link.

Figure 2:
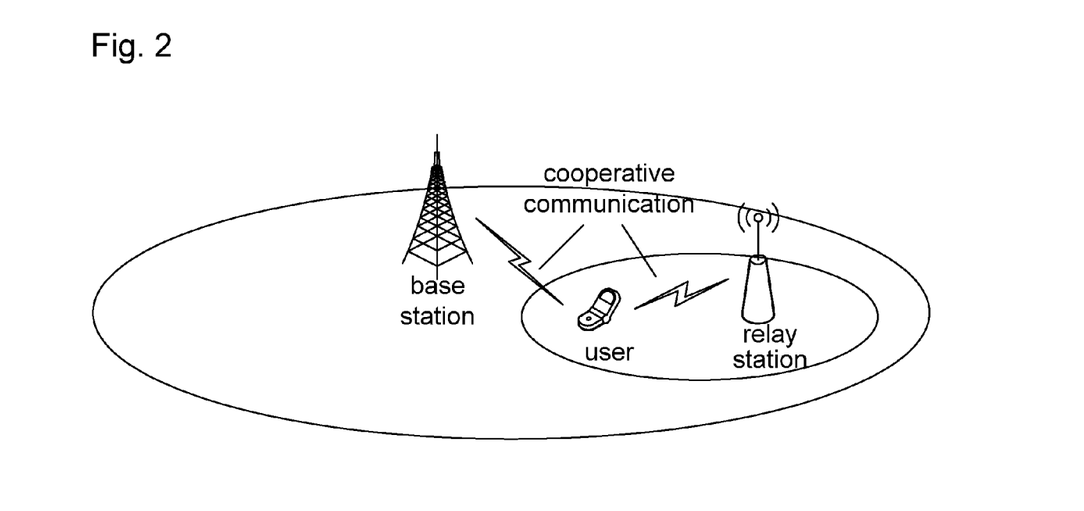
FIG. 2 shows a schematic diagram of realization of cooperative communication in the relay network.

When the user is located within the coverage of both the base station and the relay station, cooperative communication can be employed so that the base station and the relay station can jointly provide services for the user. FIG. 2 shows a schematic diagram of realization of cooperative communication in the relay network, by which system capacity and resource utilization rate can be increased.

Figure 3:
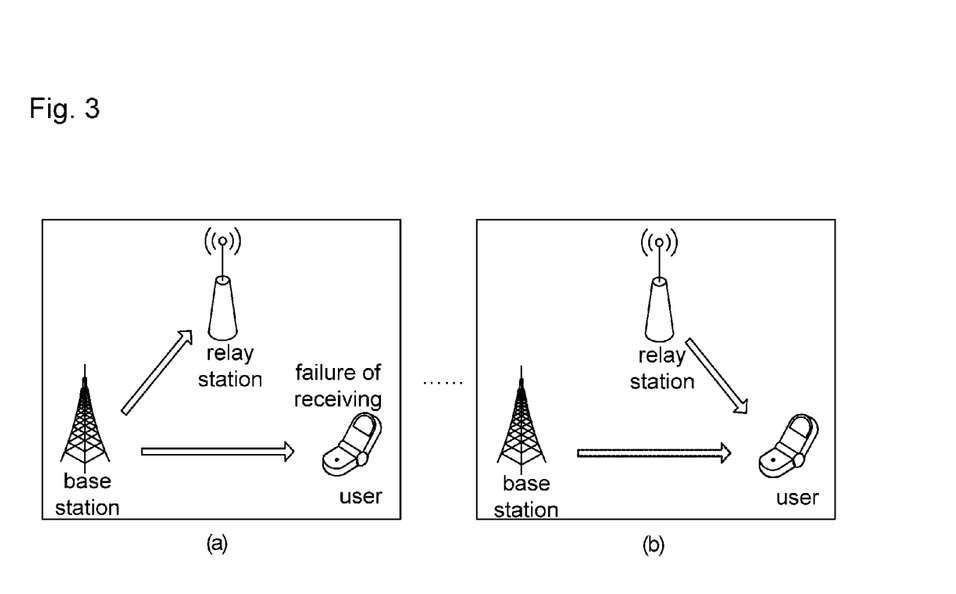
FIG. 3 shows a schematic diagram of the relay station to implement downlink cooperative retransmission.

Relay station Downlink cooperative retransmission is a cooperative communication method in the relay network. FIG. 3 shows a schematic diagram of relay station downlink cooperative retransmission. When the method is employed, as shown in FIG. 3(a) and FIG. 3(b), in the case that a receiving error occurs in the downlink transmission on the first transmission sub-frame direct link and a retransmission at the transmitter is required, the relay station performs a corresponding downlink retransmission on the retransmission sub-frame access link, to increase the transmission success rate of the downlink retransmission. The relay station downlink cooperative retransmission as shown in FIG. 3 is a cooperation method with low overhead and good compatibility, which does not need to make any change to the current system.

Figure 4:
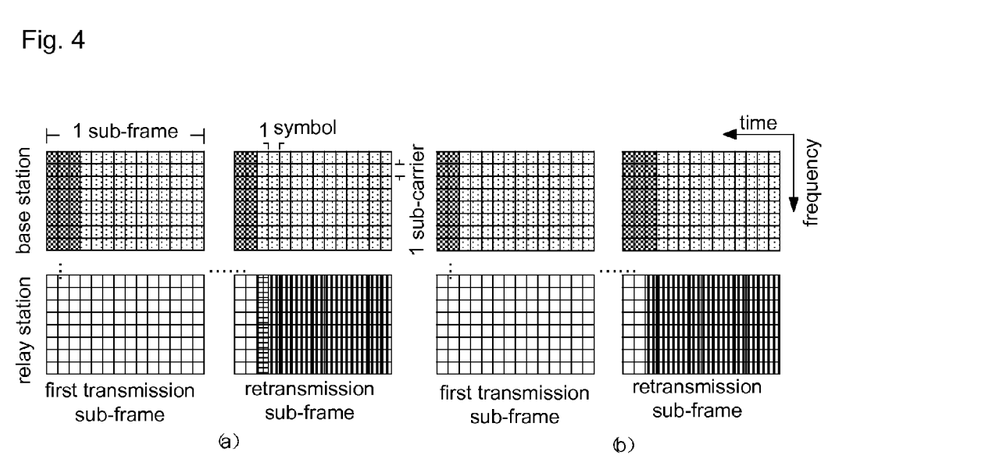
FIG. 4 shows a schematic diagram of possible problems that may occur during the relay station downlink cooperative retransmission.

However, when the relay station performs cooperative retransmission for the downlink data which is on the direct link, it is possible that the quantity of available radio resources for data retransmission is different from that for the first transmission because the quantity of radio resources occupied by the Physical Downlink Control Channel (PDCCH) on the retransmission sub-frame has been changed compared with that on the first transmission sub-frame, which means that the retransmission transmitter needs to make corresponding adjustment during the physical layer processing to match the available radio resources on the current retransmission sub-frame. FIG. 4 shows a schematic diagram of possible problems that may occur during the relay station downlink cooperative retransmission. FIG. 4(a) shows the condition that the quantity of the available radio resources increases, while FIG. 4(b) shows the condition that the quantity of the available radio resources decreases, wherein the blank squares represent unavailable resources, the dotted squares represent radio resources available for data transmission, the squares filled with staggered square shadow represent the PDCCH, the squares filled with aligned square shadow represent wasted resources and the vertical stripes represent interference.

In the current method for implementing the relay station downlink cooperation, the change of the quantity of the radio resources available for the retransmission data cannot be acquired by the relay station, thus the corresponding physical layer processing cannot be performed normally during retransmission, which, as shown in FIG. 4, may result in interference between the retransmission signals, or waste of the radio resources, or even retransmission failure, and the system performance may be reduced.

Figure 5:
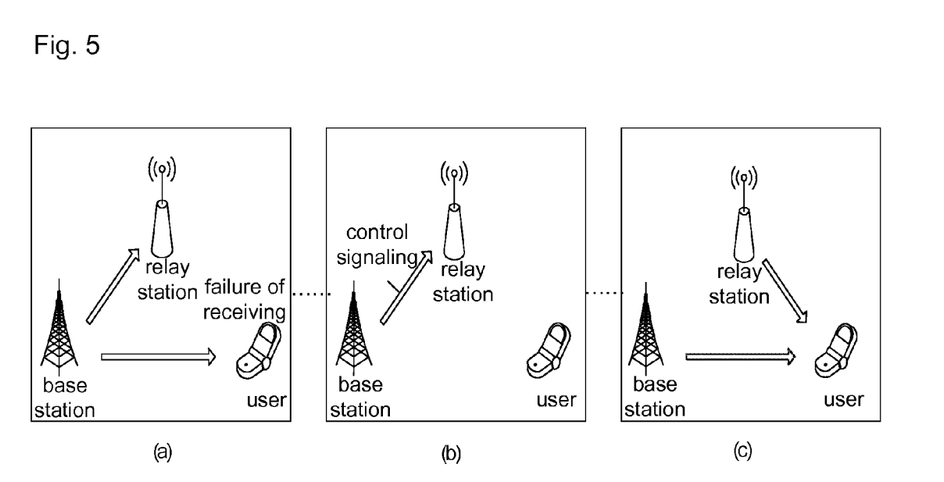
FIG. 5 shows a schematic diagram of relay station downlink cooperative retransmission based on signaling control in the prior art.

Currently, the proposal put forward to solve the aforementioned problems is shown as FIG. 5, which shows a schematic diagram of relay station downlink cooperative retransmission based on signaling control in the prior art. The base station informs the relay station of how to perform retransmission or the condition of the available radio resources on the retransmission sub-frame in advance by a control signaling on a certain control sub-frame, then the relay station performs the corresponding physical layer processing for a Transport Block (TB) to be retransmitted according to the control signaling received from the base station and performs cooperative retransmission on the retransmission sub-frame.

In the method shown as FIG. 5, the base station is required to send a control signaling to the relay station before performing the cooperative retransmission, which undoubtedly induced extra overhead. Furthermore, the relay station is required to receive the control signaling on a certain control sub-frame, however, in order to avoid self-interference, the control sub-frame cannot be configured as a cooperative retransmission sub-frame of other users, thus greatly influencing the flexibility of sub-frame configuration. In addition, the base station is required to begin to generate the control signaling and transmit it only after the condition of the available radio resources on the retransmission sub-frame is determined, and the relay station is required to begin the corresponding physical layer processing and performs the retransmission only after receiving and correctly decrypting the control from the base station, thereby resulting in a great amount of time delay and largely reducing the service quality and the resource utilization rate.

SUMMARY

In regard to this, the main objective of the present invention is to provide a method for implementing relay station downlink cooperative retransmission and a relay station to ensure normal implementation of the relay station downlink cooperative communication and improve the service quality and the resource utilization rate.

In order to realize the aforementioned objective, the technical solution of the present invention is realized as follows.

A method for implementing relay station downlink cooperative retransmission, comprises:

performing processing for a retransmission Transport Block (TB) and obtaining an available bit number for the retransmission TB by a relay station; and taking the obtained available bit number as a total available bit number, performing rate matching and processing for the retransmission TB or a Code Block (CB) obtained by segmenting the retransmission TB, then generating an Orthogonal Frequency Division Multiplexing (OFDM) signal and transmitting the generated OFDM signal on a retransmission sub-frame.

The process of obtaining the available bit number for the retransmission TB may comprise:

obtaining a least available bit number for retransmitting the TB according to an available symbol number to be determined for retransmission on the retransmission sub-frame of the relay station, a number of sub-carriers allocated to the TB to be retransmitted and a modulation order, and a total number of resource elements occupied by a pilot frequency, a synchronous signal and a system broadcasting message.

The process of obtaining the available bit number for the retransmission TB may specifically comprise: selecting a minimal available symbol number from situations of the available symbol number to be determined as the least available symbol number for the retransmission on the retransmission sub-frame; and calculating the least available bit number $N_{B\_U(Min)}$ for retransmitting the TB according to the following formula:

$$N_{B\_U(Min)} = (N_{S\_U(Min)} \times N_{C\_U} - N'_{RE}) \times Q_m \text{ Bit},$$

wherein $N_{S\_U(Min)}$ is the least available symbol number for the retransmission on the retransmission sub-frame, $N_{C\_U}$ is the number of sub-carriers allocated to the TB to be retransmitted, $Q_m$ is the modulation order, and $N'_{RE}$ is the total number of the resource elements occupied by the pilot frequency, the synchronous signal and the system broadcasting message.

The process of transmitting the generated OFDM signal on the retransmission sub-frame may comprise: retransmitting the generated OFDM signal on the retransmission sub-frame by the relay station; or retransmitting the generated OFDM signal on the retransmission sub-frame by the relay station and the base station at the same time.

The process of performing processing for the retransmission TB may comprise any combination of one or more of the followings: adding Cyclic Redundancy Check (CRC) for the TB, performing CB segmentation for the TB and adding CRC for the CB, and performing channel coding.

The processing after performing rate matching for the retransmission TB or the Code Block (CB) obtained by segmenting the retransmission TB may comprise any combination of one or more of the followings: CB series connection, scrambling, modulating, layer mapping, pre-coding, and radio resource mapping; and generating the OFDM signal.

A relay station, comprises: a first processing unit, an acquisition unit, a rate matching unit and a second processing unit, wherein the first processing unit is used for performing physical layer processing for a Transport Block (TB) to be retransmitted, and sending the processed retransmission TB or a Code Block (CB) obtained by segmenting the retransmission TB to the rate matching unit;

the acquisition unit is used for obtaining an available bit number for the retransmission TB and sending the obtained available bit number to the rate matching unit;

the rate matching unit is used for taking the received available bit number as a total available bit number, performing rate matching for the processed retransmission TB or the CB obtained by segmenting the retransmission TB and outputting the matched TB or CB to the second processing unit; and the second processing unit is used for performing other physical layer processing for the retransmission TB or CB after the rate matching, generating an Orthogonal Frequency Division Multiplexing (OFDM) signal and transmitting the generated OFDM signal on a retransmission sub-frame.

The acquisition unit may comprise an available symbol acquisition module and an available bit number acquisition module, wherein the available symbol acquisition module is used for selecting a minimal available symbol number as a least available symbol number $N_{S\_U(Min)}$ for retransmission on the retransmission sub-frame from I situations of the available symbol number to be determined and outputting the least available symbol number $N_{S\_U(Min)}$ to the available bit number acquisition module; and the available bit number acquisition module is used for calculating a product of the received available symbol number $N_{S\_U(Min)}$ and a number $N_{C\_U}$ of sub-carriers allocated to the TB to be retransmitted, reducing a number $N'_{RE}$ which is a total number of Resource Elements (REs) occupied by a pilot frequency, a synchronous signal and a system broadcasting message from the product to obtain a difference value, and multiplying the difference value by a modulation order $Q_m$ to obtain a product which is sent to the rate matching unit as the available bit number.

The first processing unit for performing physical layer processing for the TB to be retransmitted may comprise any combination of one or more of the following modules: an adding module for adding Cyclic Redundancy Check (CRC) for the TB, a segmentation module for performing CB segmentation for the TB and adding CRC for the CB, and a channel coding module.

The second processing unit for performing other physical layer processing for the retransmission TB or CB after the rate matching may comprise any combination of one or more of the following modules: a CB series connection module, a scrambling module, a modulating module, a layer mapping module, a pre-coding module and a radio resource mapping module; and an OFDM signal generating module.

It can be seen from the aforementioned technical solution provided by the present invention that according to the situation of the least available radio resource number for retransmission data on a retransmission sub-frame, the relay station performs corresponding physical layer processing in advance for the data to be retransmitted until the Orthogonal Frequency Division Multiplexing (OFDM) signal is generated, and retransmits the OFDM signal on the retransmission sub-frame. By the method of the present invention, the problem is resolved efficiently that the relay station cooperative communication cannot be performed normally due to the change of the radio resource number during downlink data retransmission, so that the normal implementation of the relay station downlink cooperative communication is ensured; furthermore, the method of the present invention does not induce any extra overhead and time delay, needs no signaling control, can be easily implemented, reduces the system complexity, ensures the flexibility of sub-frame configuration, thereby improving service quality and resource utilization rate.

DETAILED DESCRIPTION

Figure 6:
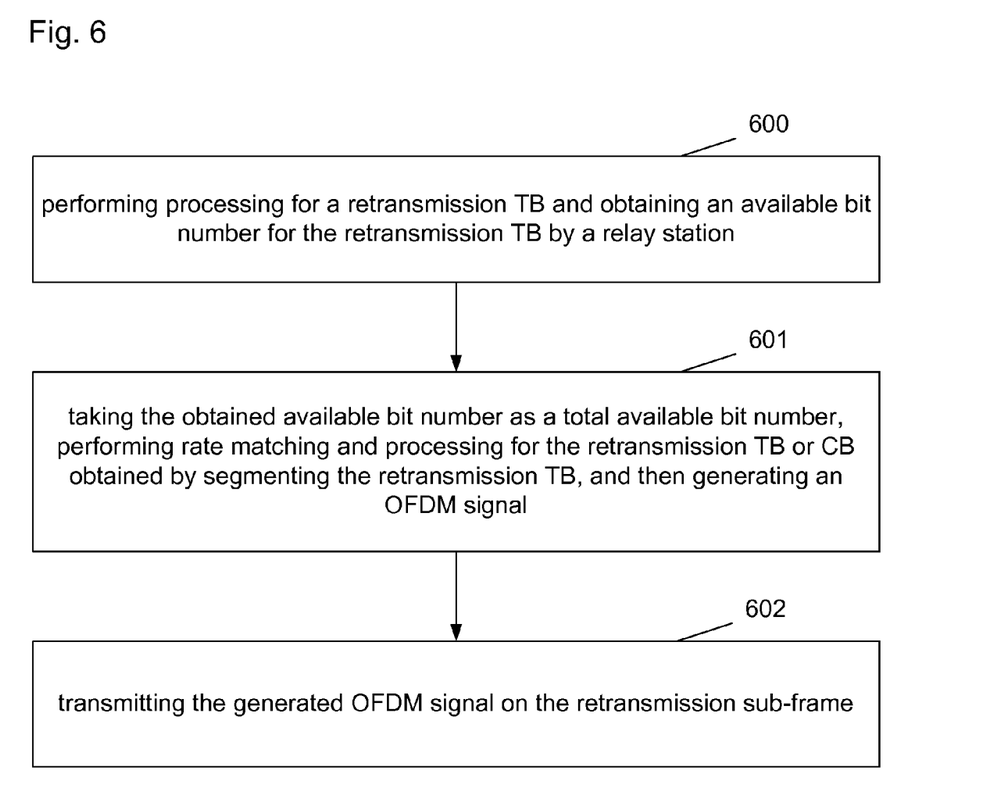
FIG. 6 shows a flowchart of the method for implementing relay station downlink cooperative retransmission of the present invention.

FIG. 6 shows a flowchart of the method for implementing relay station downlink cooperative retransmission of the present invention. When a relay station detects that downlink cooperative retransmission is required, as shown in FIG. 6, the method of the present invention comprises the following steps.

Step 600: performing processing for a retransmission TB and obtaining an available bit number for the retransmission TB by a relay station.

In this step, the relay station performs physical layer processing for the TB to be retransmitted, the processing comprises any combination of one or more of the followings: adding Cyclic Redundancy Check (CRC) for the TB, performing Code Block (CB) segmentation for the retransmission TB and adding CRC for the CB, and performing channel coding processing. The specific implementation of the processing is a widely-known technology for those skilled in the art and it is unnecessary to go into details here. There is no limitation to the sequence of the process of performing processing for the retransmission TB and the process of obtaining the available bit number for the retransmission TB, and these two processes can be performed at the same time.

The implementation of obtaining the available bit number for the retransmission TB in this step may comprise: obtaining a least available bit number for retransmitting the TB according to an available symbol number to be determined for the retransmission on a retransmission sub-frame of the relay station, a number of sub-carriers allocated to the TB to be retransmitted and a modulation order, and a total number of resource elements (REs) occupied by a pilot frequency, a synchronous signal and a system broadcasting message. The step of obtaining a least available bit number for retransmitting the TB specifically comprises:

Provided that there are I situations of the available symbol number to be determined for the retransmission on the retransmission sub-frame of the relay station, namely $N_{S\_U}^{(i)}$ ($1 \leq i \leq I$). A minimal available symbol number is selected from the I situations of the available symbol number to be determined as a least available symbol number $N_{S\_U(Min)}$ used for the retransmission on the retransmission sub-frame, whose unit is Symbol, as shown in formula (1):

$$N_{S\_U(Min)} = \text{Min}(N^{(1)}_{S\_U}, N^{(2)}_{S\_U}, \ldots N^{(I)}_{S\_U}) \text{Symbol} \quad (1)$$

wherein Min( ) represents a minimal value. Herein, the selection of the minimal available symbol number as the least available symbol number used for the retransmission on the retransmission sub-frame can largely inhibit the interference between the retransmission signals, save radio resources, ensure successful retransmission and improve the system performance.

Provided that the number of sub-carriers allocated to the TB to be retransmitted and the modulation order are $N_{C\_U}$ and $Q_m$, respectively, the total number of REs occupied by the pilot frequency, the synchronous signal and the system broadcasting message is $N'_{RE}$, the least available bit number $N_{B\_U(Min)}$ for retransmitting the TB, whose unit is Bit, can be obtained according to formula (2):

$$N_{B\_U(Min)} = (N_{S\_U(Min)} \times N_{C\_U} - N'_{RE}) \times Q_m \text{ Bit} \quad (2)$$

It needs to be explained that the parameters I, $N_{C\_U}$, $Q_m$ and $N_{RE\_RS}$ are known parameters of the relay station and the base station, obtaining processes of which are not related to the present invention, and it is unnecessary to go into details here. What is emphasized here is that the least available bit number for retransmitting the TB is obtained from these known parameters.

Step 601: taking the obtained available bit number as a total available bit number, performing rate matching and processing for the retransmission TB or CB obtained by segmenting the retransmission TB, and then generating an Orthogonal Frequency Division Multiplexing (OFDM) signal.

taking the obtained least available bit number for retransmitting the TB as the total available bit number for retransmitting the TB, the relay station performs rate matching for the TB or CB obtained by segmenting the retransmission TB, and performs other physical layer processing for the TB or CB after the rate matching until the OFDM signal is generated, wherein other physical layer processing comprises any combination of one or more of the followings: CB series connection, scrambling, modulating, layer mapping, precoding, and radio resource mapping; and generating an OFDM signal. The specific implementation of this step is customary practice for those skilled in the art and it is unnecessary to go into details here. What is emphasized in this step is that the available bit number obtained in step 600 is used as the total available bit number.

It can be understood from the method of the present invention that according to the condition of the least available radio resource number for retransmission data on a retransmission sub-frame, the relay station performs corresponding physical layer processing in advance for the data to be retransmitted until the OFDM signal is generated, thus the problem is resolved efficiently that the relay station cooperative communication cannot be performed normally due to the change of the radio resource number during downlink data retransmission, so that the normal implementation of the relay station downlink cooperative communication is ensured; furthermore, the method of the present invention does not induce any extra overhead and time delay, needs no signaling control, can be easily implemented, reduces the system complexity, ensures the flexibility of sub-frame configuration, thereby improving service quality and resource utilization rate.

Step 602: transmitting the generated OFDM signal on the retransmission sub-frame.

The retransmission can be performed by the relay station or performed by both the base station and the relay station.

Figure 7:
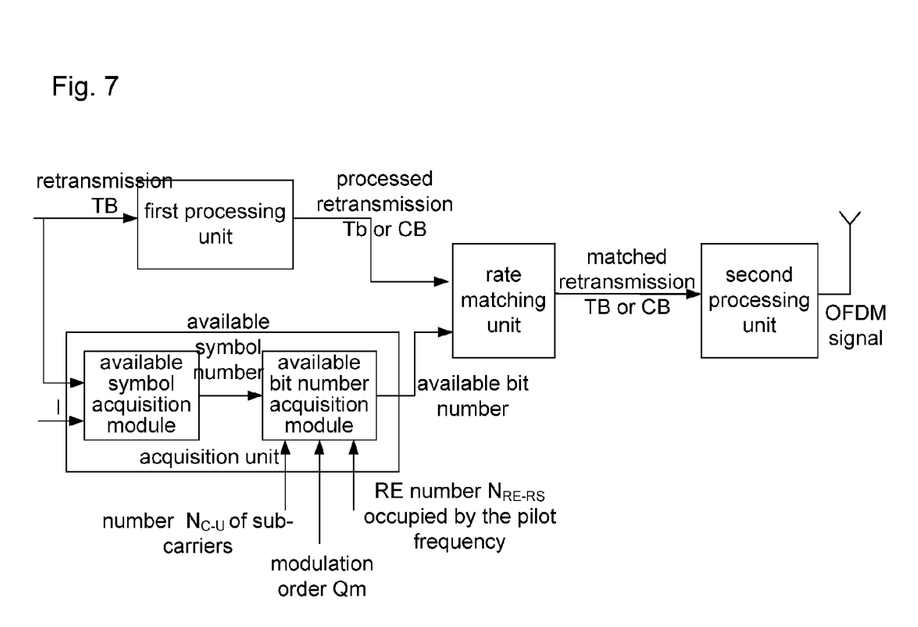
FIG. 7 shows a schematic diagram of the structural composition of the relay station of the present invention.

Corresponding to the method of the present invention, a relay station is further provided. FIG. 7 shows a schematic diagram of the structural composition of the relay station of the present invention. As shown in FIG. 7, the relay station of the present invention comprises a first processing unit, an acquisition unit, a rate matching unit and a second processing unit.

The first processing unit is used for performing physical layer processing for the TB to be retransmitted, and sending the processed retransmission TB to the rate matching unit. The physical layer processing of the first processing unit involves any combination of one or more of the following modules: an adding module for adding Cyclic Redundancy Check (CRC) for the TB, a segmentation module for performing CB segmentation for the retransmission TB and adding CRC for the CB, and a channel coding module, which are not shown in FIG. 7.

The acquisition unit is used for obtaining an available bit number for the retransmission TB and sending the obtained available bit number to the rate matching unit. The acquisition unit may comprise an available symbol acquisition module and an available bit number acquisition module, wherein the available symbol acquisition module is used for selecting a minimal available symbol number as the least available symbol number $N_{S\_U(Min)}$ for the retransmission on the retransmission sub-frame from I situations of the available symbol number to be determined and outputting the least available symbol number $N_{S\_U(Min)}$ to the available bit number acquisition module; and the available bit number acquisition module is used for calculating a product of the received available symbol number $N_{S\_U(Min)}$ and a number $N_{C\_U}$ of sub-carriers allocated to the TB to be retransmitted, reducing a number $N'_{RE}$ which is a total number of Resource Elements (REs) occupied by a pilot frequency, a synchronous signal and a system broadcasting message from the product to obtain a difference value, and multiplying the difference value by a modulation order $Q_m$ to obtain a product which is sent to the rate matching unit as the available bit number.

the rate matching unit is used for taking the received available bit number as the total available bit number, performing rate matching for the processed retransmission TB or for the CB obtained by segmenting the retransmission TB, and outputting the matched TB or CB to the second processing unit.

The second processing unit is used for performing other physical layer processing for the retransmission TB or CB after the rate matching, generating an OFDM signal and transmitting the generated OFDM signal on the retransmission sub-frame. The other physical layer processing of the second processing unit involves any combination of one or more of the following modules: a CB series connection module, a scrambling module, a modulating module, a layer mapping module, a pre-coding module and a radio resource mapping module; and an OFDM signal generating module, which are not shown in FIG. 7.

The present invention is described in details hereinafter in combination with some embodiments.

The first embodiment: provided that in a relay network employing the downlink cooperative retransmission, the relay station detects that it needs to perform downlink cooperative retransmission for one TB, and the process specifically comprises:

Firstly, the relay station performs physical layer processing for the TB to be retransmitted, and it is provided that there are two situations of the available symbol number to be determined for the retransmission on the retransmission sub-frame obtained by the relay station, namely $N^{(i)}_{S\_U}$, ($1 \le i \le 2$): $N^{(1)}_{S\_U}=12$ Symbol, $N^{(2)}_{S\_U}=11$ Symbol, therefore the least available symbol number for the retransmission on the retransmission sub-frame is $N_{S\_U(Min)}=Min(N^{(1)}_{S\_U}, N^{(2)}_{S\_U}, \ldots N^{(I)}_{S\_U})=Min(12,11)=11$ Symbol.

Provided that the number $N_{C\_U}$ of sub-carriers allocated to the TB is 24, the modulation order $Q_m$ is 2 and the number $N'_{RE}$ which is the total number of the Resource Elements (REs) occupied by the pilot frequency, the synchronous signal and the system broadcasting message is 12, according to formula (2), the least available bit number for retransmitting the TB is $N_{B\_U(Min)}=(N_{S\_U(Min)} \times N_{C\_U} - N'_{RE}) \times Q_m = (11 \times 24 - 12) \times 2 = 504$ Bit.

Subsequently, the relay station takes the obtained least available bit number $N_{B\_U(Min)}=504$ Bit for retransmitting the TB as the total available bit number for retransmitting the TB to perform rate matching for the CB obtained by segmenting the retransmission TB, and performs other physical layer processing for the CB after the rate matching until the OFDM signal is generated.

Finally, the relay station and the base station retransmit the generated OFDM signal on the retransmission sub-frame.

The second embodiment: provided that in a relay network employing the downlink cooperative retransmission, the relay station detects that it needs to perform downlink cooperative retransmission for one TB, and the process specifically comprises:

Firstly, the relay station performs physical layer processing for the TB to be retransmitted, and it is provided that there are three situations of the available symbol number to be determined for the retransmission on the retransmission sub-frame obtained by the relay station, namely $N^{(i)}_{S\_U}$, ($1 \le i \le 3$): $N^{(1)}_{S\_U}=12$ Symbol, $N^{(2)}_{S\_U}=11$ Symbol, $N^{(3)}_{S\_U}=10$ Symbol, therefore the least available symbol number for the retransmission on the retransmission sub-frame is $N_{S\_U(Min)}=Min(N^{(1)}_{S\_U}, N^{(2)}_{S\_U}, \ldots N^{(I)}_{S\_U})=Min(12,11,10)=10$ Symbol.

Provided that the number $N_{C\_U}$ of sub-carriers allocated to the TB is 48, the modulation order $Q_m$ is 4 and the number $N'_{RE}$ which is the total number of the Resource Elements (REs) occupied by the pilot frequency, the synchronous signal and the system broadcasting message is 64, according to formula (2), the least available bit number for retransmitting the TB is $N_{B\_U(Min)}=(N_{S\_U(Min)} \times N_{C\_U} - N'_{RE}) \times Q_m = (10 \times 48 - 64) \times 4 = 1664$ Bit.

Subsequently, the relay station takes the obtained least available bit number $N_{B\_U(Min)}=1644$ Bit for retransmitting the TB as the total available bit number for retransmitting the TB to perform rate matching for the retransmission TB, and performs other physical layer processing for the TB after the rate matching until the OFDM signal is generated.

Finally, the relay station retransmits the generated OFDM signal on the retransmission sub-frame.

The third embodiment: provided that in a relay network applying the downlink cooperative retransmission, the relay station detects that it needs to perform downlink cooperative retransmission for one TB, and the process specifically comprises:

Firstly, the relay station performs physical layer processing for the TB to be retransmitted, and it is provided that there are two situations of the available symbol number to be determined for the retransmission on the retransmission sub-frame obtained by the relay station, namely $N^{(i)}_{S\_U}$, ($1 \le i \le 2$): $N^{(1)}_{S\_U}=13$ Symbol, $N^{(2)}_{S\_U}=12$ Symbol, therefore the least available symbol number for the retransmission on the retransmission sub-frame is $N_{S\_U(Min)}=Min(N^{(1)}_{S\_U}, N^{(2)}_{S\_U}, \ldots N^{(I)}_{S\_U})=Min(13,12)=12$ Symbol.

Provided that the number $N_{C\_U}$ of sub-carriers allocated to the TB is 36, the modulation order $Q_m$ is 6 and the number $N'_{RE}$ which is the total number of the Resource Elements (REs) occupied by the pilot frequency, the synchronous signal and the system broadcasting message is 36, according to formula (2), the least available bit number for retransmitting the TB is $N_{B\_U(Min)}=(N_{S\_U(Min)} \times N_{C\_U} - N_{RE\_RS}) \times Q_m = (12 \times 36 - 36) \times 6 = 2376$ Bit.

Subsequently, the relay station takes the obtained least available bit number $N_{B\_U(Min)}$=2376 Bit for retransmitting the TB as the total available bit number for retransmitting the TB to perform rate matching for the retransmission TB, and performs other physical layer processing for the TB after the rate matching until the OFDM signal is generated.

Finally, the relay station and the base station retransmit the generated OFDM signal on the retransmission sub-frame.

The fourth embodiment: provided that in a relay network applying the downlink cooperative retransmission, the relay station detects that it needs to perform downlink cooperative retransmission for one TB, and the process specifically comprises:

Firstly, the relay station performs physical layer processing for the TB to be retransmitted, and it is provided that there is only one situation of the available symbol number to be determined for the retransmission on the retransmission sub-frame obtained by the relay station, namely $N^{(i)}_{S\_U}$, (i=1): $N^{(1)}_{S\_U}$=10 Symbol, therefore the least available symbol number for the retransmission on the retransmission sub-frame is $N_{S\_U(Min)}$=Min($N^{(1)}_{S\_U}, N^{(2)}_{S\_U}, \ldots N^{(I)}_{S\_U}$)=Min(10)=10 Symbol.

Provided that the number $N_{C\_U}$ of sub-carriers allocated to the TB is 36, the modulation order $Q_m$ is 6 and the number $N'_{RE}$ which is the total number of the Resource Elements (REs) occupied by the pilot frequency, the synchronous signal and the system broadcasting message is 36, according to formula (2), the least available bit number for retransmitting the TB is $N_{B\_U(Min)}=(N_{S\_U(Min)} \times N_{C\_U} - N_{RE\_RS}) \times Q_m$=(10×36−36)×6=1944 Bit.

Subsequently, the relay station takes the obtained least available bit number $N_{B\_U(Min)}$=1944 Bit for retransmitting the TB as the total available bit number for retransmitting the TB to perform rate matching for the retransmission TB, and performs other physical layer processing for the TB after the rate matching until the OFDM signal is generated.

Finally, the relay station and the base station retransmit the generated OFDM signal on the retransmission sub-frame.

What is claimed is:

1. A method for implementing relay station downlink cooperative retransmission, comprising:
    performing processing for a retransmission Transport Block (TB) and obtaining an available bit number for the retransmission TB by a relay station; and
    taking the obtained available bit number as a total available bit number, performing rate matching and processing for the retransmission TB or a Code Bolck (CB) obtained by segmenting the retransmission TB, generating an Orthogonal Frequency Division Multiplexing (OFDM) signal and transmitting the generated OFDM signal on a retransmission sub-frame;
    wherein the process of obtaining the available bit number for the retransmission TB comprises:
    obtaining a least available bit number for retransmitting the TB according to an available symbol number to be determined for retransmission on the retransmission sub-frame of the relay station, a number of sub-carriers allocated to the TB to be retransmitted and a modulation order, and a total number of resource elements occupied by a pilot frequency, a synchronous signal and a system broadcasting message.

2. The method according to claim 1, wherein the process of obtaining the available bit number for the retransmission TB specifically comprises: selecting a minimal available symbol number from situations of the available symbol number to be determined as the least available symbol number for the retransmission on the retransmission sub-frame; and calculating the least available bit number $N_{B\_U(Min)}$ for retransmitting the TB according to a following formula:

$$N_{B\_(Min)}=(N_{S\_(Min)} \times N_{C\_U} - N'_{RE}) \times Q_m \text{ Bit},$$

wherein $N_{S\_U(Min)}$ is the least available symbol number for the retransmission on the retransmission sub-frame, $N_{C\_U}$ is the number of sub-carriers allocated to the TB to be retransmitted, $Q_m$ is the modulation order, and $N'_{RE}$ is the total number of the resource elements occupied by the pilot frequency, the synchronous signal and the system broadcasting message.

3. The method according to claim 1, wherein the process of transmitting the generated OFDM signal on the retransmission sub-frame comprises: retransmitting to the generated OFDM signal on the retransmission sub-frame by the relay station; or
    retransmitting the generated OFDM signal on the retransmission sub-frame by the relay station and the base station at the same time.

4. The method according to claim 1, wherein the process of performing processing for the retransmission TB comprises any combination of one or more of the followings: adding Cyclic Redundancy Check (CRC) for the TB, performing CB segmentation for the TB and adding CRC for the CB, and performing channel coding.

5. The method according to claim 1, wherein the processing after performing rate matching for the retransmission TB or the Code Block (CB) obtained by segmenting the retransmission TB comprises any combination of one or more of the followings: CB series connection, scrambling, modulating, layer mapping, pre-coding, and radio resource mapping; and generating the OFDM signal.

6. A relay station, comprising: a first processing unit, an acquisition unit, a rate matching unit and a second processing unit, wherein
    the first processing unit is used for performing physical layer processing for a Transport Block (TB) to be retransmitted, and sending the processed retransmission TB or a Code Block (CB) obtained by segmenting the retransmission TB to the rate matching unit;
    the acquisition unit is used for obtaining a least available bit number for the retransmission TB according to an available symbol number to be determined for retransmission on the retransmission sub-frame of the relay station, a number of sub-carriers allocated to the TB to be retransmitted and a modulation order, and a total to number of resource elements occupied by a pilot frequency, a synchronous signal and a system broadcasting message; and sending the obtained available bit number to the rate matching unit;
    the rate matching unit is used for taking the received available bit number as a total available bit number, performing rate matching for the processed retransmission TB or the CB obtained by segmenting the retransmission TB and outputting the matched TB or CB to the second processing unit; and
    the second processing unit is used for performing other physical layer processing for the retransmission TB or CB after the rate matching, generating an Orthogonal Frequency Division Multiplexing (OFDM) signal and transmitting the generated OFDM signal on a retransmission sub-frame;
    wherein the first processing unit, the acquisition unit, the rate matching unit and the second processing unit are each the result of execution on a processor of instructions stored in a memory.

7. The relay station according to claim 6, wherein the acquisition unit comprises an available symbol acquisition module and an available bit number acquisition module, wherein
    the available symbol acquisition module is used for selecting a minimal available symbol number as a least available symbol number $N_{S\_U(Min)}$ for retransmission on the retransmission sub-frame from I situations of the available symbol number to be determined and outputting the least available symbol number $N_{S\_U(Min)}$ to the available bit number acquisition module; and
    the available bit number acquisition module is used for calculating a product of the received available symbol number $N_{S\_U(Min)}$ and a number $N_{C\_U}$ of sub-carriers allocated to the TB to be retransmitted, reducing a number $N'_{RE}$ which is a total number to of Resource Elements (REs) occupied by a pilot frequency, a synchronous signal and a system broadcasting message from the product to obtain a difference value, and multiplying the difference value by a modulation order $Q_m$ to obtain a product which is sent to the rate matching unit as the available bit number;
    wherein the available symbol acquisition module and the available bit number acquisition module are each the result of execution on a processor of instructions stored in a memory.

8. The relay station according to claim 6, wherein the first processing unit for performing physical layer processing for the TB to be retransmitted comprises any combination of one or more of the following modules: an adding module for adding Cyclic Redundancy Check (CRC) for the TB, a segmentation module for performing CB segmentation for the TB and adding CRC for the CB, and a channel coding module;
    wherein the adding module, the segmentation module and the channel coding module are each the result of execution on a processor of instructions stored in a memory.

9. The relay station according to claim 6, wherein the second processing unit for performing other physical layer processing for the retransmission TB or CB after the rate matching comprises any combination of one or more of the following modules: a CB series connection module, a scrambling module, a modulating module, a layer mapping module, a pre-coding module and a radio resource mapping module; and
    an OFDM signal generating module;
    wherein these modules are each the result of execution on a processor of instructions stored in a memory.

* * * * *